UNITED STATES PATENT OFFICE.

LEONE PHILLIP, OF REDLANDS, CALIFORNIA.

FERTILIZER.

1,322,817. Specification of Letters Patent. Patented Nov. 25, 1919.

No Drawing. Application filed June 17, 1919. Serial No. 304,943.

*To all whom it may concern:*

Be it known that I, LEONE PHILLIP, a citizen of Italy, residing at Redlands, in the county of San Bernardino and State of California, have invented new and useful Improvements in Fertilizers, of which the following is a specification.

My invention relates to a fertilizer.

It is an object of this invention to produce a fertilizer from a by-product by a simple process, which by-product hitherto has been allowed to go to waste. The fertilizer may either be used alone or as an ingredient in a compound fertilizer.

My invention consists of the composition hereinafter described and claimed.

In Texas, Southern California, and other places where the sweet almond tree is grown (*Prunus amygdalus communis*) the hull or fleshy pulp surrounding the almond kernel is a by-product allowed to go to waste and cannot be used as a fertilizer in its natural state, and when allowed to decay, as is the common practice, has proved a nuisance to the neighborhood.

I have discovered that by a simple method this by-product can be manufactured into a valuable fertilizer. I take the fleshy rinds or pulp surrounding the kernel and dry them in the sun in order to facilitate the incinerating operation to which they are subjected later. I incinerate the almond rinds in an open fire, using wood or the like to start the fire, the rinds being sufficiently dry to support a slow combustion until the whole mass is thoroughly incinerated, leaving pearly gray granular ashes. The analysis of the ashes as shown follows:

Total nitrogen _____ .03%
Phosphorus pentoxid, $P_2O_5$ _____ 3.52%
Water soluble potassium oxid, $K_2O$ _ 25.6 %

It is, therefore, evident, owing to the phosphoric acid and potassium contents of the ashes, that a valuable fertilizer is obtained, which may be used alone or mixed with other fertilizer compounds to modify the same so as to raise the potassium and phosphoric acid contents.

I claim:

1. A fertilizer compound, comprising ashes of almond rinds (*Prunus amygdalus communis*).

2. A fertilizer containing as one of its ingredients ashes of the almond rinds.

In testimony whereof I have signed my name to this specification.

LEONE PHILLIP